United States Patent
Canelis et al.

(10) Patent No.: US 11,163,819 B2
(45) Date of Patent: Nov. 2, 2021

(54) IMAGE SEARCH AND RETRIEVAL USING OBJECT ATTRIBUTES

(71) Applicant: Adobe Inc., San Jose, CA (US)

(72) Inventors: John Canelis, San Francisco, CA (US); Grace Arnold, Menlo Park, CA (US)

(73) Assignee: Adobe Inc., San Jose, CA (US)

(*) Notice: Subject to any disclaimer, the term of this patent is extended or adjusted under 35 U.S.C. 154(b) by 297 days.

(21) Appl. No.: 15/790,455

(22) Filed: Oct. 23, 2017

(65) Prior Publication Data
US 2019/0121879 A1    Apr. 25, 2019

(51) Int. Cl.
| | |
|---|---|
| *G06F 16/53* | (2019.01) |
| *G06F 16/532* | (2019.01) |
| *G06F 16/583* | (2019.01) |
| *G06F 16/9535* | (2019.01) |
| *G06F 16/248* | (2019.01) |
| *G06F 3/0481* | (2013.01) |
| *G06F 3/0482* | (2013.01) |
| *G06F 3/0484* | (2013.01) |

(52) U.S. Cl.
CPC .......... *G06F 16/532* (2019.01); *G06F 3/0482* (2013.01); *G06F 3/04817* (2013.01); *G06F 3/04845* (2013.01); *G06F 16/248* (2019.01); *G06F 16/5838* (2019.01); *G06F 16/9535* (2019.01)

(58) Field of Classification Search
CPC ............... G06F 16/532; G06F 16/5583; G06F 16/55838; G06F 16/9535; G06F 16/248; G06F 3/04817; G06F 3/0482; G06F 3/04845

USPC .................................................. 707/705, 706
See application file for complete search history.

(56) References Cited

U.S. PATENT DOCUMENTS

| | | | |
|---|---|---|---|
| 7,096,423 B2 | 8/2006 | Murata | |
| 7,636,450 B1 | 12/2009 | Bourdev | |
| 7,716,157 B1 | 5/2010 | Bourdev et al. | |
| 7,813,557 B1 | 10/2010 | Bourdev | |
| 8,718,369 B1* | 5/2014 | Tompkins | G06Q 30/0623 382/181 |
| 9,087,078 B2* | 7/2015 | Becherer | G06F 16/3328 |
| 9,232,173 B1 | 1/2016 | Duggal et al. | |
| 9,646,362 B2* | 5/2017 | Dai | G06T 3/40 |
| 10,043,109 B1* | 8/2018 | Du | G06N 3/0454 |
| 10,121,171 B1* | 11/2018 | Chang | G06Q 30/0643 |
| 2008/0162031 A1* | 7/2008 | Okuyama | G01C 21/367 701/532 |

(Continued)

*Primary Examiner* — Hares Jami
(74) *Attorney, Agent, or Firm* — Finch & Maloney PLLC

(57) ABSTRACT

A technique for image search and retrieval in a digital medium environment includes performing a search for images satisfying a given query, displaying a result of the search query via a graphical user interface (GUI), refining the result of the search query by selecting images or objects via the GUI, automatically performing an additional search for images satisfying an updated search query based on the selected images or objects, and displaying the result of the updated search query via the GUI. In addition to selecting images or objects, one or more attributes of an object, such as the position of the selected object within the image, the size of the selected object within the image, or both, can be modified such that the updated search incorporates the modified attributes of the object.

20 Claims, 12 Drawing Sheets

(56) References Cited

U.S. PATENT DOCUMENTS

| | | | |
|---|---|---|---|
| 2014/0112598 A1* | 4/2014 | Yamashita | G06K 9/4676 |
| | | | 382/305 |
| 2014/0258271 A1* | 9/2014 | Kong | G06F 16/5866 |
| | | | 707/722 |
| 2014/0279246 A1* | 9/2014 | Chen | G06F 16/58 |
| | | | 705/26.61 |
| 2014/0314313 A1* | 10/2014 | Kennedy | G06K 9/00369 |
| | | | 382/165 |
| 2014/0344766 A1* | 11/2014 | Cao | G06F 3/017 |
| | | | 715/863 |
| 2017/0308553 A1* | 10/2017 | Xu | G06F 16/532 |
| 2018/0225290 A1* | 8/2018 | Leppanen | G06F 16/54 |
| 2019/0370547 A1* | 12/2019 | Lee | G06K 9/00671 |

\* cited by examiner

IMAGE SEARCH AND RETRIEVAL USING OBJECT ATTRIBUTES

FIELD OF THE DISCLOSURE

This disclosure relates generally to digital image processing, and more particularly, to image search and retrieval techniques in a digital medium environment using the attributes of an object appearing in an image.

BACKGROUND

Automatic detection processes can be used to identify objects appearing in an image. Such detection processes are useful when searching for images that meet certain criteria. For example, an image search process can use object detection to select images containing a particular type of object from a large collection of images. Objects appearing in images may include, for example, landscape features (mountains, lakes, beaches, sky), structures (buildings, bridges, monuments), machines (automobiles, factory equipment, aircraft), people, animals, plants or trees, or any other thing that can be uniquely identified. Object detection techniques generate data from existing images that can be used to quickly and efficiently find those images meeting specified search criteria.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Overview

Figure 1:
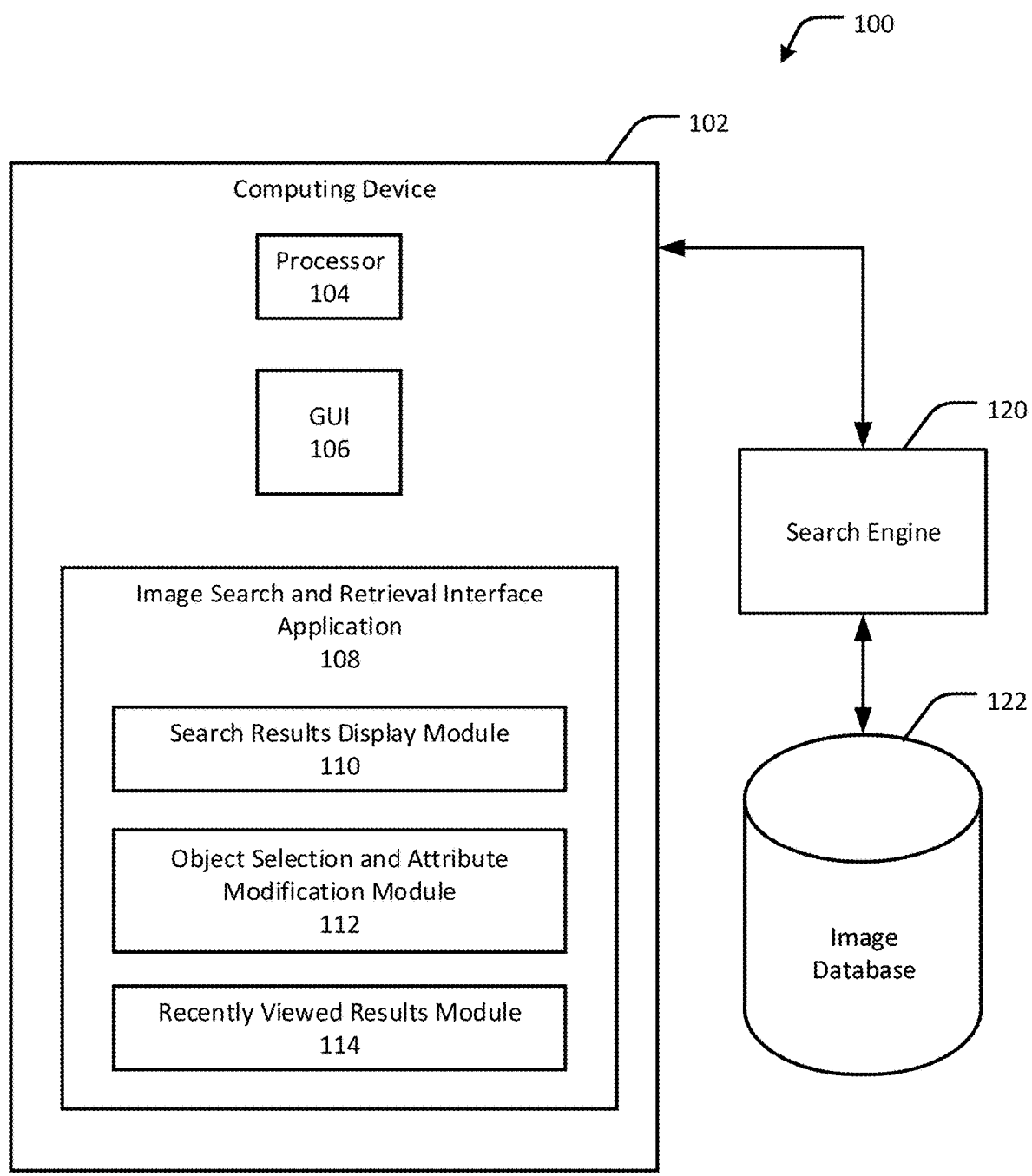
FIG. 1 shows an example system for image search and retrieval, in accordance with an embodiment of the present disclosure.

Conventional searches of digitally stored image libraries and databases are performed by matching search queries with metadata tags associated with the stored images. In a simple example, one or more images having a metadata tag "skyscraper" are retrieved from a database and presented to a user in response to a query that includes the term "skyscraper." Somewhat more sophisticated search algorithms can potentially retrieve a larger and more diverse set of images that have metadata tags similar or related to "skyscraper," such as "city," "building" or "tower," by using various language recognition and machine learning techniques. However, sole reliance on keywords and tagging in conventional search techniques can lead to inadequate results that are not the most relevant or useful to the user. Furthermore, conventional metadata tags do not necessarily capture information about the composition of the image, such as the relative positioning and size of objects in the scene, making it difficult if not impossible to provide results that meet these criteria. In such cases, users may be forced to manually cull a large set of results to locate the images of particular interest. Therefore, image search and retrieval techniques are needed to improve the ability to quickly locate images of interest to the user.

To this end, and in accordance with an embodiment of the present disclosure, techniques are provided for image search and retrieval in a digital medium environment using object attributes. An example image search and retrieval workflow generally includes performing a search for images satisfying a given query, displaying a result of the search query via a graphical user interface (GUI), refining the result of the search query by selecting images or objects via the GUI, automatically performing an additional search for images satisfying an updated search query based on the selected images or objects, and displaying the result of the updated search query via the GUI. In addition to selecting images or objects, one or more attributes of an object, such as the position of the selected object within the image, the size of the selected object within the image, or both, can be modified such that the updated search incorporates the modified attributes of the object.

In more detail, a GUI is configured to display a first image of a first object. The first object corresponds to a result of a search query processed by a search engine. For example, if a user submits a query to search for images of teacups, then the result of the query may include one or more images of teacups.

The first image is associated with first metadata representing one or more attributes of the first object. For example, using the teacup example, the image of the teacup may be associated with the keyword "teacup," "cup," "drinking cup," "mug," or other suitable terms that describe the teacup as it appears in the image. Other information can be encoded into the metadata to describe the object more specifically, or to describe the image more completely. For example, in addition to the keyword "teacup," the image may be further associated with metadata that describes attributes of the teacup, such as style, pattern or color, or metadata that describes the position or size of the teacup within the image, or metadata that yet further describes other objects in the image, such as a table upon which the teacup is sitting or any other objects that are visible in the scene.

A selection of the first object from within the display of the first image is received via the GUI. For example, using the teacup example, the user can select the teacup by clicking on it from within the image using a mouse or other suitable input device. Alternatively, the user can more generally select any portion of the image containing the teacup. In response to receiving the selection of the first image or the object from within the display of the first image, an updated search query is automatically generated and sent to the search engine without further input from the user. The updated search query can include at least a portion of the first metadata representing the one or more attributes of the first image or object selected by the user. For example, if the original search query included the keyword "teacup," such as described above, then the updated search query can include keywords or metadata representing additional attributes of the selected image or object, such as the style, pattern, color, position or size of the teacup, where such attributes are associated with the first image.

The updated search query is processed by the search engine to generate a new result, including a second image of a second object. The second image is associated with the portion of the first metadata representing the one or more attributes of the first image or object selected by the user. Continuing the teacup example, the second image may be a different image of the same teacup, or an image of a different teacup having attributes similar to the teacup in the first image. The GUI is further configured to display the second image of the second object corresponding to the result of the updated search query. In this manner, the user can easily refine the results of an initial search for images of teacups by clicking on an image of a particular teacup to automatically and quickly obtain additional images of teacups that are similar to the teacup in the selected image. Numerous configurations and variations will be apparent in light of this disclosure.

For instance, according to some embodiments, in addition to selecting the first object in the first image, the user can modify one or more attributes of the first object, such as the position of the selected object within the image, the size of the selected object within the image, or both. It will be understood that the position of the object, the size of the object, or both can be modified relative to the overall image. For example, the user can move the object from the center of the image to the upper left corner of the image, or the user can enlarge the object so that it covers a larger portion of the image. In this sense, the attributes of the object are modified by the user with respect to the original image in which the object appears. After the user modifies an attribute of the first object, an updated search query including the modified attributes is automatically generated and processed by the search engine to generate a new result including one or more additional images of objects having the modified attributes. The GUI is further configured to display the additional images of the object corresponding to the result of the updated search query. For instance, in the teacup example, if the user moves the teacup from the center of the image to the lower right corner of the image, the images generated from the result of the updated search query will include additional images of teacups that appear in the lower right corner of the image.

System Architecture

FIG. 1 shows an example system 100 for image search and retrieval, in accordance with an embodiment of the present disclosure. The system 100 includes a computing device 102 having a processor 104, a GUI 106, and an image search and retrieval interface application 108. The computing device 102 is configured to execute the image search and retrieval interface application 108, which includes a search results display module 110, an object selection and attribute modification module 112, a recently viewed results module 114, or any combination of these. The computing device 102 is further configured to interact with a search engine 120 and an image database 122. In some embodiments, the search engine 120, the image database 122, or both can be implemented on a back-end server that is remote from the computing device 102 and in communication with the computing device 102 over a network, such as the Internet or an intranet. The search engine 120 can be configured to search the image database 122 for images that meet specified criteria. The image database 120 can include any suitable digital storage device configured to store digitally encoded image data. In some embodiments, the image data represents images of objects, either real objects photographed by a camera or other objects that are artificially added to the image. The images may be associated with one or more attributes, such as keywords or metadata that describe the types of objects appearing in the image, as well as the location and size of the objects relative to the image frame.

As described in further detail below with respect to, for example, FIGS. 2-11, the image search and retrieval interface application 108 is generally configured to perform one or more of the following functions: causing one or more images corresponding to a result of a search query to be displayed to the user via the GUI 106, receiving user selections of images and objects within the images via the GUI 106, interacting with the search engine 120 to obtain additional images from the image database 122 in accordance with one or more updated search queries, and causing the additional images to be displayed to the user via the GUI 106.

Example Methodology

Figure 2:
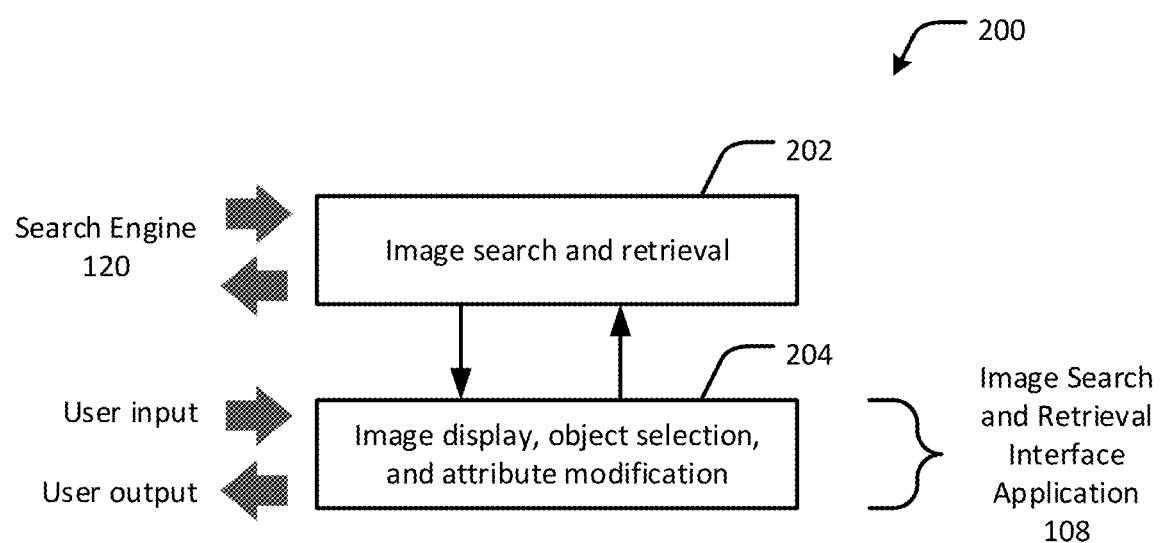
FIG. 2 is a flow diagram for an image search and retrieval method, in accordance with an embodiment of the present disclosure.

FIG. 2 is a flow diagram for an image search and retrieval method 200, in accordance with an embodiment of the present disclosure. All or portions of the method 200 can be implemented, for example, in the image search and retrieval interface application 108, in the search engine 120, or a combination of both. The method 200 includes an image search and retrieval process 202 that is configured to interact with a search engine. The method 200 further includes an image display, object selection, and attribute modification process 204 that is configured to interact with user inputs and outputs. The image search and retrieval process 202 can be implemented in the search engine 120 of FIG. 1. The image display, object selection, and attribute modification process 204 can be implemented in the image search and retrieval interface application 108 of FIG. 1. Additionally, the image display, object selection, and attribute modification process 204 can be configured to receive user inputs and provide user outputs via the GUI 106 of FIG. 1.

The image search and retrieval process 202 includes performing a search for images in the image database 122 or other suitable storage device, where the images satisfy an initial query, and automatically performing an additional search for images satisfying an updated search query. The image display, object selection, and attribute modification process 204 includes displaying a result of the initial search query via the GUI, refining the result of the search query by selecting images or objects via the GUI and updating the initial search query accordingly, and displaying the result of the updated search query via the GUI. Further details of the processes 202 and 204 are described with respect to FIG. 3.

Figure 3:
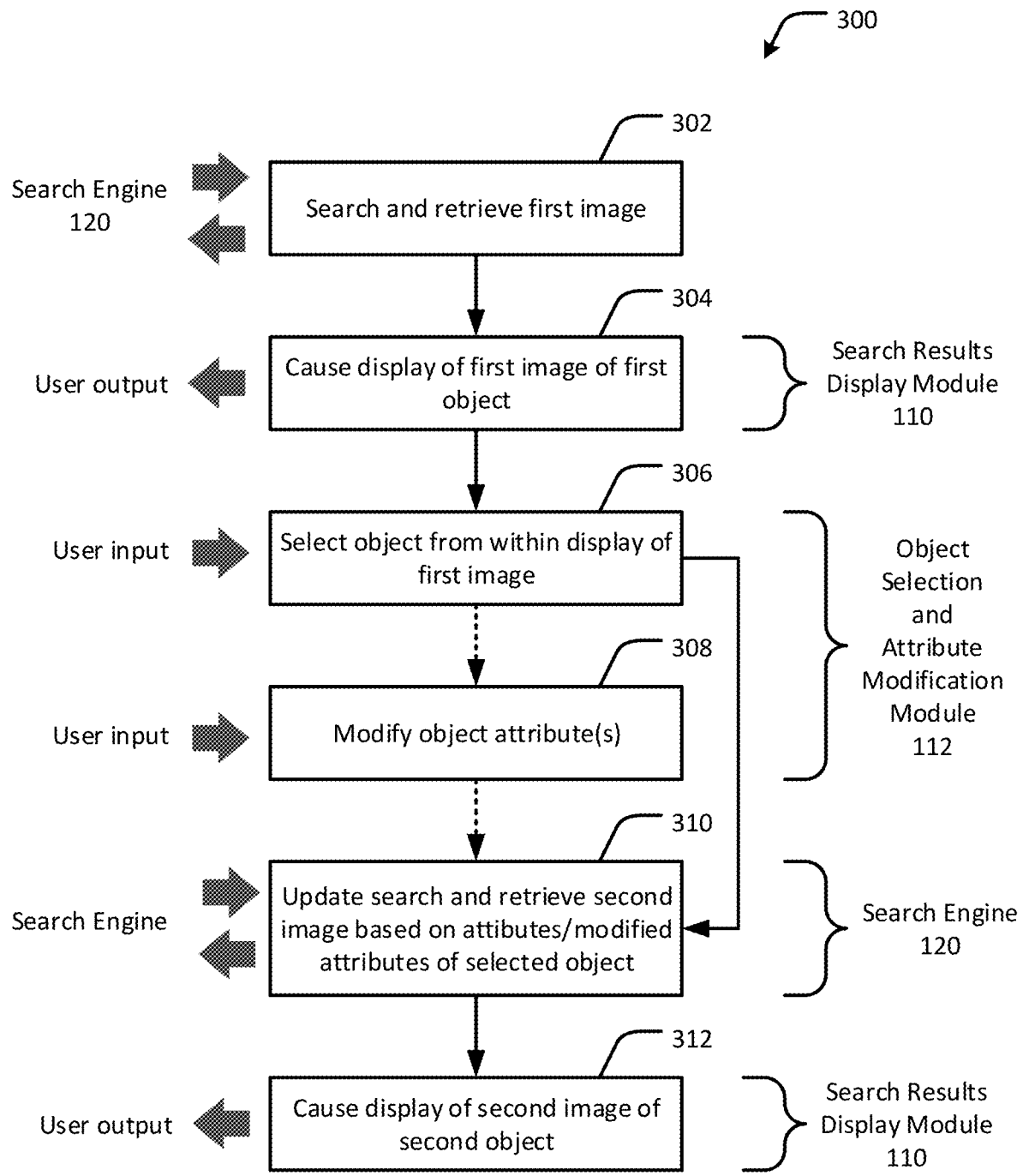
FIG. 3 is a flow diagram for an image search and retrieval method, in accordance with an embodiment of the present disclosure.

FIG. 3 is a flow diagram for an image search and retrieval method 300, in accordance with an embodiment of the present disclosure. All or portions of the method 300 can be implemented, for example, in the image search and retrieval interface application 108, in the search engine 120, or a combination of both. The method 300 includes searching for and retrieving 302 a first image via the search engine 120. The search and retrieval 302 is based on a search query provided by a user or automatically generated based on a user input, such as through a search engine interface or an image selection interface. The method 300 further includes causing the GUI 106 to display 304 a first image of a first object to a user. The causing of the display 304 can be implemented in the search results display module 110. An example use case for the search and retrieval 302 and the image display 304 is described with respect to FIG. 5.

Figure 5:
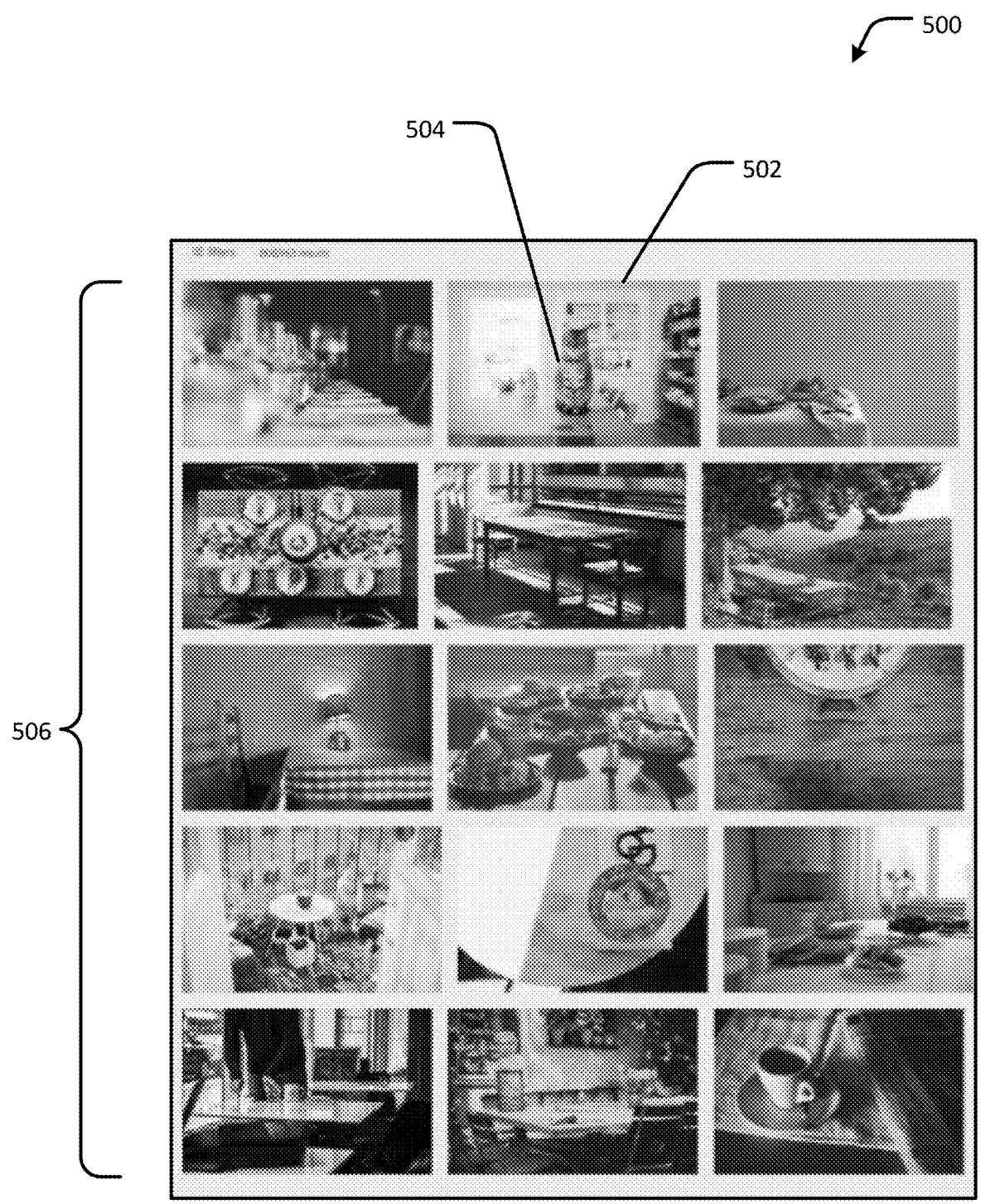
FIGS. 5-11 show different configurations of an example graphical user interface (GUI) for image search and retrieval, in accordance with an embodiment of the present disclosure.

FIG. 5 shows a configuration of an example GUI 500 for image search and retrieval, in accordance with an embodiment of the present disclosure. The GUI 500 is designed to enable a user to view displayed images and interact with the computing device 102. The GUI 500 includes a first image 502 of a first object 504. The first image 502 corresponds to a result of a search query processed by the search engine 120, which is displayed on the GUI 106 of the computing device 102 via the image search and retrieval interface application 108. In this example, the first object is a cat, although the image also includes other objects, such as a table.

Any number of suitable search queries can be used to cause the search engine 120 to generate the result. For example, the search query can include keywords or other forms of metadata representing one or more attributes of the first object 504 in the first image 502. The attributes describe the types of objects appearing in the image, as well as the location and size of the objects relative to the image frame. Other non-limiting examples of suitable techniques for selecting objects in images and searching for images containing objects are disclosed in U.S. Pat. No. 7,096,423 (Robert Murata, "Layout-based page capture"), U.S. Pat. No. 7,716,157 (Lubomir Bourdev et al., "Searching images with extracted objects"), U.S. Pat. No. 7,636,450 (Lubomir Bourdev, "Displaying detected objects to indicate grouping"), U.S. Pat. No. 7,813,557 (Lubomir Bourdev, "Tagging detected objects"), and U.S. Pat. No. 9,232,173 (Ashish Duggal et al., "Method and apparatus for providing engaging experience in an asset"), each of which is incorporated herein by reference.

As used in this disclosure, the term "metadata," in addition to its plain and ordinary meaning, refers to data about data. For example, metadata includes a digital form of information that describes the visual content of an image represented by computer-readable image data. The content of an image can include one or more objects, either real objects that are the subject of a photograph, or artificial objects that are placed into the image by a human or a computer. The object or objects form the composition of the image, and may be the subject of the image as well. For example, the search query can include the term "table" to generate the result shown in FIG. 5. The search engine 120 can use conventional techniques to process the search query, such as keyword matching, and return images corresponding to the result to the computing device 102 for display in the GUI 500. Further, the first image 502 is associated with first metadata representing one or more attributes of the first object 504. For example, in FIG. 5, the first image 502 includes a cat and other objects, such as a table, chairs, shelves, and a doorway. The first image 502 is associated with one or more attributes that describe the objects in the image.

The GUI 500 can further include a set of first images 506, including the first image 502. Some or all of the images in the set 506 can correspond to the result of the search query or some other criteria, even if the composition and subject varies from one image to another. In this manner, the user can see several different images at once. For example, in FIG. 5, each of the images in the set 506 are of tables and tabletops, while some of the images include other objects, such as a cup, a lamp, a tree, and plates of food. Any of the images displayed in the GUI 500 can be selected by the user.

Referring again to FIG. 3, the method 300 further includes receiving 306 a selection of the first object from within the display of the first image via the GUI 106. The receiving 306 can be implemented in the object selection and attribute modification module 112. An example use case for the selection receiving 306 is described with respect to FIG. 6.

Figure 6:
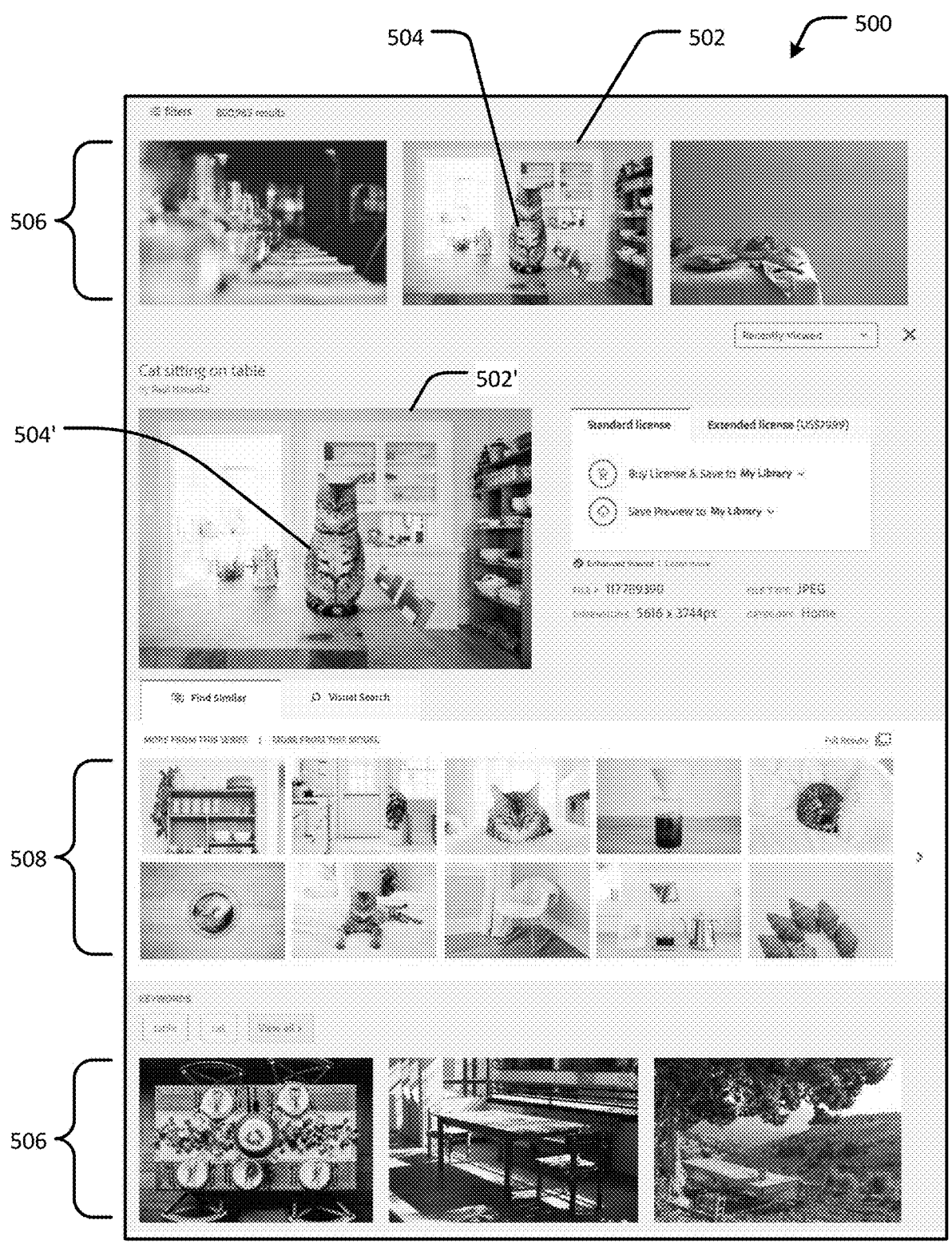

FIG. 6 shows another configuration of the GUI 500 of FIG. 5, in accordance with an embodiment of the present disclosure. FIG. 6 includes the first image 502, which can be separately displayed as indicated at 502'. The first image 502' includes the first object 504'. The configuration of the GUI 500 shown in FIG. 6 results from a selection of the first image 502, such as via a user input (mouse, keyboard, touch sensitive screen, voice command, or other suitable user interface modality). For example, if the user clicks on the image 502, then the GUI displays an enlarged version of image 502'.

In response to selecting the first image 502, the search query that was used by the search engine 120 to locate and retrieve the first image 502 is automatically updated by the image search and retrieval interface application 108 without requiring or using any further user input. The updated search query is then sent to the search engine 120 for processing. The search engine 120 returns a result of the updated search query, which includes one or more second images 508. The GUI 500 is configured to display the one or more second images 508, such as shown in FIG. 6 under the tab labeled "Find Similar." For example, once the user clicks on the image 502, the one or more second images 508 are automatically retrieved and displayed in the GUI 500. The one or more second images 508 contain content similar to the selected image 502 (for example, images of cats). Note that some or all of the second images 508 can be different than images in the first set of images 506, which were the result of the earlier search query before it was modified. In some embodiments, the GUI 500 is configured to display images in both the set of first images 506 and the set of second images 508 at the same time. Any of the images displayed in the GUI 500 can be selected by the user.

The updated search query is based on one or more attributes (e.g., keywords and metadata) of the selected first image 502. The updated search query can include keywords and metadata associated with the selected first image 502, in addition to (or instead of) any keywords and metadata in the original search query that was used by the search engine 120 to locate and retrieve the first image 502. For example, if the original search query included the keyword "table," and the keyword "cat" is associated with the selected first image 502, then the updated search query can include the keywords "table" and "cat." As a result of the updated search query, the search engine 120 may return one or more second images 508 that are associated with the keywords "table," "cat," or both, depending on whether the search is performed using logical "and" or logical "or." In some embodiments, the search logic (e.g., "and" or "or") is user selectable, although for the purpose of culling a large collection of images into a smaller set of search results, logical "and" may be used as a default.

Referring again to FIG. 3, in some embodiments, the method 300 further includes receiving 308 a modification of at least one of the attributes of the selected object in the first image. The receiving 308 can be implemented in the object selection and attribute modification module 112.

The method 300 further includes updating 310 the search and retrieving a second image based on the original attributes of the selected object or, if alternatively the attributes are modified, the modified attributes of the selected object. The updating 310 can be implemented in the search engine 120. The method 300 further includes causing 312 the GUI 106 to display 304 a second image of a second object to the user. The causing of the display 312 can be implemented in the search results display module 110.

Figure 7:
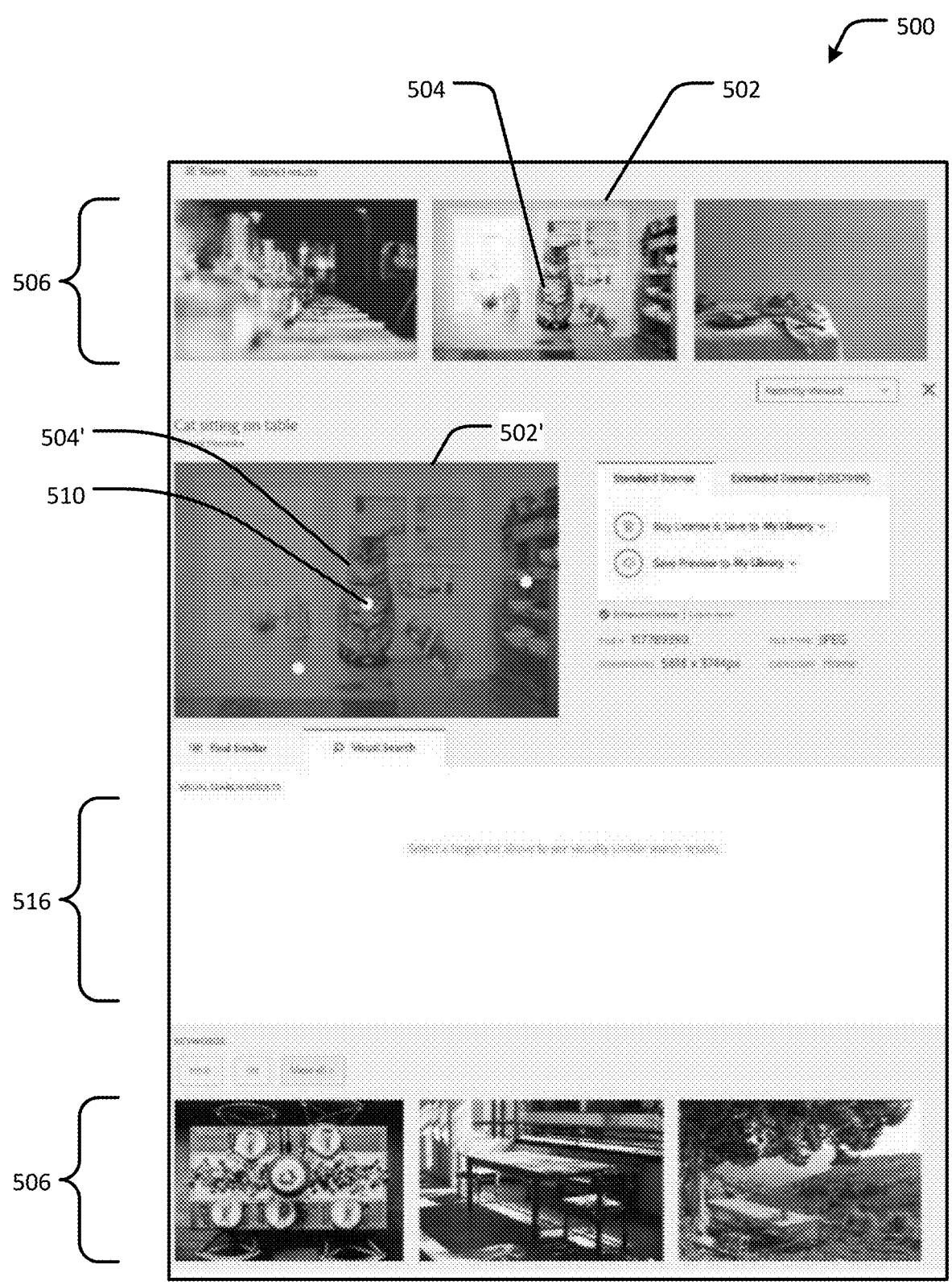
Figure 8:
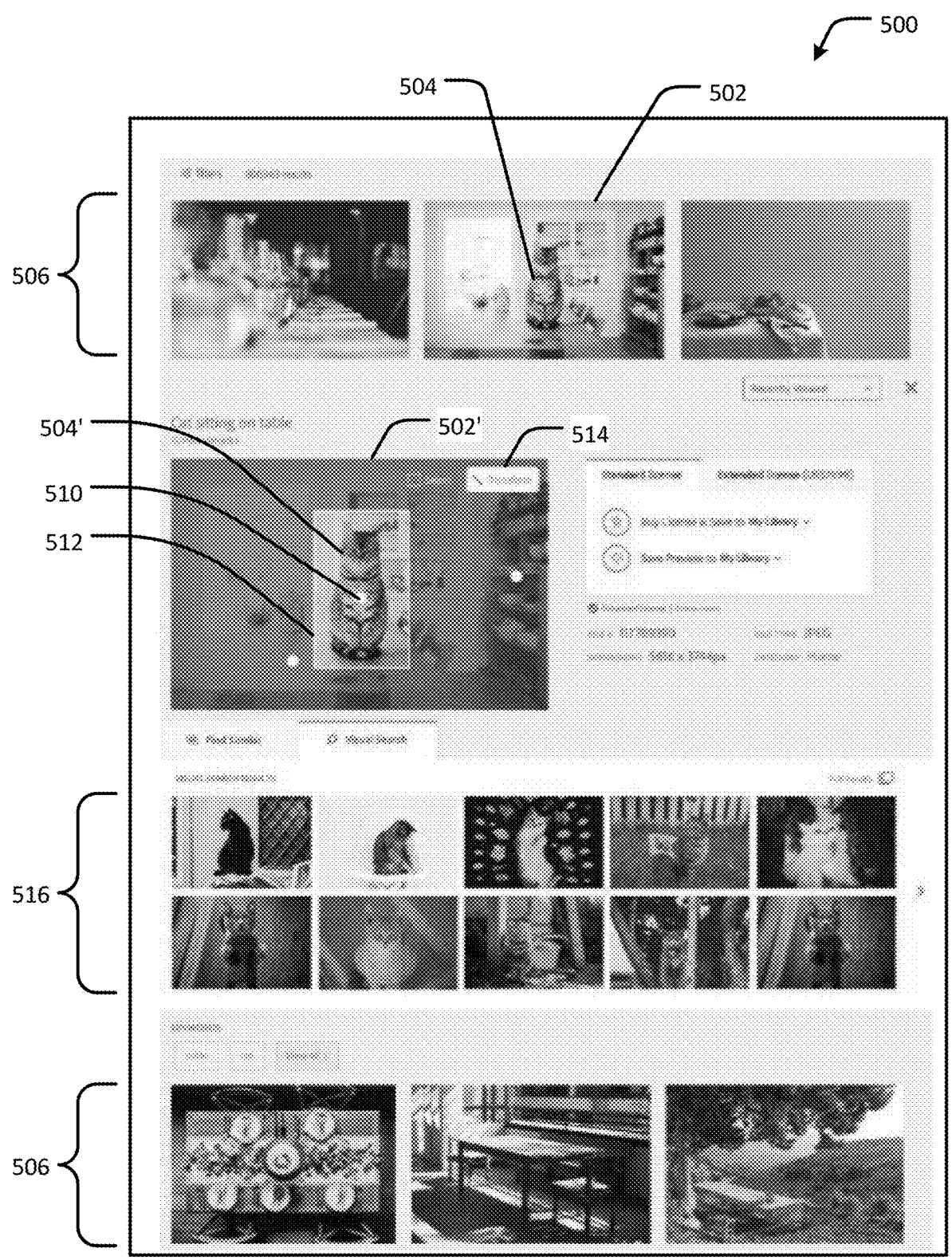
Figure 9:
Figure 10:
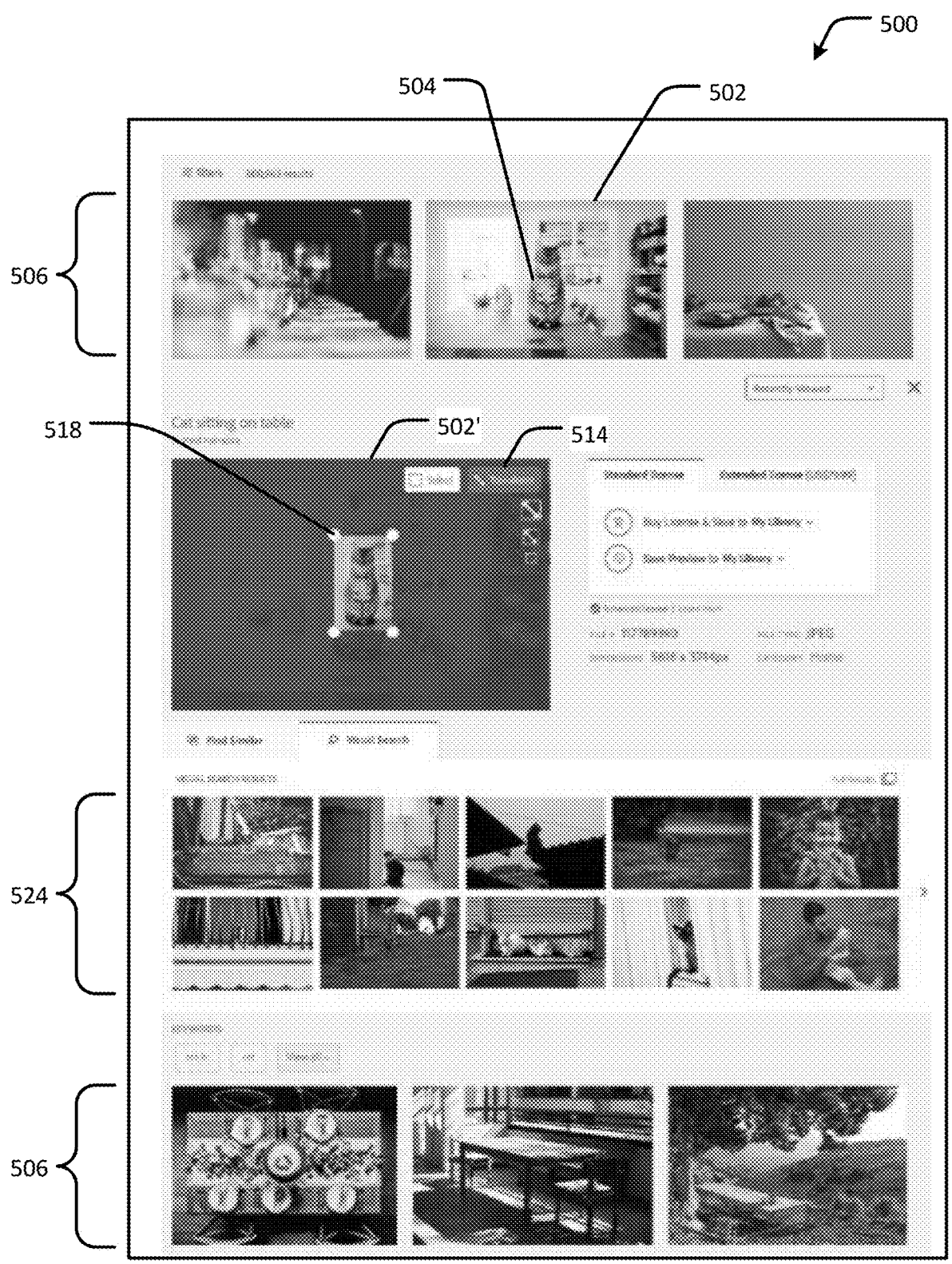

Several example use cases for receiving the modified attributes 308, updating the search 310, and displaying the second image 312 are described with respect to FIGS. 6, 7, 8, 9 and 10. More specifically, FIGS. 6, 7 and 8 describe an example use case where a user-selectable hotspot corresponding to an object in the selected image is displayed in the GUI 500. The hotspot can be selected via the user interface to select the corresponding object, which automatically refines and updates the search to retrieve images of objects similar to the selected object. FIGS. 6 and 9 describe an example use case where a selected object can be repositioned via the user interface, which automatically refines and updates the search to retrieve images of objects in positions similar to the object repositioned by the user. FIGS. 6 and 10 describe an example use case where a selected object can be resized via the user interface, which automatically refines the search to retrieve images of objects having a size similar to the object resized by the user.

In further detail, FIG. 7 shows another configuration of the GUI 500 of FIG. 5, in accordance with an embodiment of the present disclosure. FIG. 7 includes the first image 502, which can be separately displayed as indicated at 502', such as described with respect to FIG. 6. The enlarged first image 502' includes the first object 504'. The configuration of the GUI 500 shown in FIG. 7 results from a selection of the first image 502, such as via a user input (mouse, keyboard, touch sensitive screen, voice command, or other suitable user interface modality). Additionally, the configuration of the GUI 500 shown in FIG. 7 includes one or more user-selectable hotspots 510. As used in this disclosure, the term "hotspot" includes one or more pixels in an image that can be selected by a user (e.g., via an input device such as a mouse pointing to the hotspot). A hotspot can further include a user affordance, such as a visible dot or other shape, to indicate the position of the hotspot within the image.

The hotspot 510 corresponds to a position of the object 504' within the image 502'. The position of the hotspot is determined from the attributes of the object 504' within the image 502. For example, the attributes of the object 504' may include pixel coordinates (or a range of pixel coordinates) that correspond to a location of the object 504' within the image 502'. Other hotspots may be displayed in the GUI 500 for other objects within the image 502, such as the table and the shelves, where such information is available. An image display region 516 of the GUI 500 as shown in FIG. 7 is empty until the user selects one of the hotspots (e.g., hotspot 510).

FIG. 8 shows another configuration of the GUI 500 of FIG. 5, in accordance with an embodiment of the present disclosure. FIG. 8 includes the first image 502, which can be separately highlighted or enlarged as indicated at 502', such as described with respect to FIG. 6. The enlarged first image 502' includes the first object 504'. The configuration of the GUI 500 shown in FIG. 8 results from a selection of the first image 502, such as via a user input (mouse, keyboard, touch sensitive screen, voice command, or other suitable user interface modality), and further from the selection of the hotspot 510, such as described with respect to FIG. 7. In this example, the hotspot 510 corresponds to a position of the object 504' within the image 502'.

In response to selecting the hotspot 510, the search query that was used by the search engine 120 to locate and retrieve the first image 502 is automatically updated by the image search and retrieval interface application 108 without requiring or using any further user input. The updated search query is then sent to the search engine 120 for processing. The search engine 120 returns a result of the updated search query, which includes one or more additional images, which are used to populate the image display region 516. The GUI 500 is configured to display the additional images in the region 516, such as shown in FIG. 8. Note that some or all of the additional images displayed in the region 516 can be different than images in the first set of images 506, which were the result of the earlier search query before it was updated, and the second set of images 508, which were the result of the search query after it was updated by the initial selection of the image 502 (as described above with respect to FIG. 6) but before the hotspot 510 was selected. In some embodiments, the GUI 500 is configured to display images in both the set of first images 506, the set of second images 508, and the additional images displayed in region 516. Any of the images displayed in the GUI 500 can be selected by the user for further search or retrieval.

The updated search query is based on one or more attributes (e.g., keywords and metadata) of the object 504' selected from within the first image 502' via the hotspot 510. In contrast to the updated search query described with respect to FIG. 6, in this example the updated search query can include keywords and metadata associated with the object 504' selected from within the first image 502', in addition to (or instead of) any keywords and metadata in the original search query that was used by the search engine 120 to locate and retrieve the first image 502. In other words, by selecting the object 504' via the hotspot 510, the search query can be updated to more specifically refer to the attributes of the object 504' within the first image 502, as opposed to the first image 502' more generally. For example, if the original search query included the keyword "table," and the keyword "cat" is associated with the selected first image 502, then the updated search query can include the keyword "cat." As a result of the updated search query, the search engine 120 may return one or more additional images that are associated with the keyword "cat" and displayed in region 516.

FIG. 9 shows another configuration of the GUI 500 of FIG. 5, in accordance with an embodiment of the present disclosure. FIG. 9 includes the first image 502, which can be separately highlighted or enlarged as indicated at 502', such as described with respect to FIG. 6. The enlarged first image 502' includes the first object 504'. The configuration of the GUI 500 shown in FIG. 9 results from a selection of the first image 502, such as via a user input (mouse, keyboard, touch sensitive screen, voice command, or other suitable user interface modality), and further from repositioning the object 504' selected from within the first image 502' via the hotspot 510, such as described with respect to FIG. 8. In this example, the hotspot 510 corresponds to a position of the object 504' within the image 502'. As can be seen by comparing FIGS. 8 and 9, the position of the selected object 504' can be adjusted by the user from the original location within the selected first image 502' to a different location, as indicated at 518 in FIG. 9. The selected object 504' including the hotspot 510 can be a separate image file that is moved with respect to the underlying first image 502'. A reference grid can be established over the first image 502', and the selected object 504' including the hotspot 510 can be repositioned with respect to the coordinates of the reference grid. For example, the reference grid can be divided into quadrants, and the new position of the selected object 504' can be identified with respect to one of the quadrants.

In response to selecting the hotspot 510 and repositioning the selected first object 504', the search query that was used by the search engine 120 to locate and retrieve the first image 502 is automatically updated by the image search and retrieval interface application 108 without requiring or using any further user input. The updated search query can include, for example, the new position of the selected first object 504' including the hotspot 510 with respect to the reference grid coordinates (or quadrants). The updated search query is then sent to the search engine 120 for processing. The search engine 120 returns a result of the updated search query, which includes one or more additional images, which are used to populate the image display region 520. The GUI 500 is configured to display the additional images 520, such as shown in FIG. 9. Note that some or all of the additional images 520 can be different than images in the first set of images 506, which were the result of the earlier search query before it was updated, and the second set of images 508, which were the result of the search query after it was updated by the selection of the image 502 (as described above with respect to FIG. 6), but before the first object 504' was selected and repositioned via the hotspot 510. In some embodiments, the GUI 500 is configured to display images in both the set of first images 506, the set of second images 508, and the additional images 520. Any of the images displayed in the GUI 500 can be selected by the user for further search or retrieval.

The updated search query is based on one or more attributes (e.g., keywords and metadata) of the object 504' selected from within the first image 502' via the hotspot 510. The attributes used in the updated search query are modified in response to the user repositioning the object 504' within the first image 502'. In contrast to the updated search query described with respect to FIG. 6, in this example the updated search query can include keywords and metadata associated with the object 504' selected from within the first image 502', in addition to (or instead of) any keywords and metadata in the original search query that was used by the search engine 120 to locate and retrieve the first image 502, including information describing the new (modified) position of the selected object 504' within the image 502' after the user repositions the object 504'. In other words, by selecting and repositioning the object 504', the search query can be updated to more specifically refer to the attributes of the object 504' within the first image 502, including the relative position of the object within the frame of the image, as opposed to the attributes of the unmodified first image 502' more generally. For example, if the original search query included the keyword "table," and the keyword "cat" is associated with the selected first image 502, then the updated search query can include the keyword "cat." The updated search query further includes metadata representing the new position of the selected first object 504' within the frame of the first image 502', such as the pixel coordinates of the repositioned image 518. As a result of the updated search query, the search engine 120 may return one or more additional images (displayed in region 516) that are associated with the keyword "cat" as well as images where a cat appears in generally the same position of the additional images as in the modified first image 502' after the user moves the selected first object 504'.

FIG. 10 shows another configuration of the GUI 500 of FIG. 5, in accordance with an embodiment of the present disclosure. FIG. 10 includes the first image 502, which can be separately highlighted or enlarged as indicated at 502', such as described with respect to FIG. 6. The enlarged first image 502' includes the first object 504'. The configuration of the GUI 500 shown in FIG. 10 results from a selection of the first image 502, such as via a user input (mouse, keyboard, touch sensitive screen, voice command, or other suitable user interface modality), and further from resizing the object 504' selected from within the first image 502' via the hotspot 510, such as described with respect to FIG. 7. In this example, the hotspot 510 corresponds to a position of the object 504' within the image 502'. As can be seen by comparing FIGS. 8 and 10, the size of the selected object 504' can be adjusted by the user from the original size within the selected first image 504' to a different size (larger or smaller), as indicated at 518 in FIG. 10.

In response to selecting the hotspot 510 and resizing the selected first object 504', the search query that was used by the search engine 120 to locate and retrieve the first image 502 is automatically modified by the image search and retrieval interface application 108 without requiring or using any further user input. The updated search query is then sent to the search engine 120 for processing. The search engine 120 returns a result of the updated search query, which includes one or more additional images, which are used to populate the image display region 524. The GUI 500 is configured to display the additional images in the region 524, such as shown in FIG. 8. Note that some or all of the additional images displayed in region 524 can be different than images in the first set of images 506, which were the result of the earlier search query before it was updated, and the second set of images 508, which were the result of the search query after it was updated by the selection of the image 502 (as described above with respect to FIG. 6), but before the first object 504' was selected via the hotspot 510. In some embodiments, the GUI 500 is configured to display images in both the set of first images 506, the set of second images 508, and the additional images displayed in region 524. Any of the images displayed in the GUI 500 can be selected by the user for further search or retrieval.

The updated search query is based on one or more attributes (e.g., keywords and metadata) of the object 504' selected from within the first image 502' via the hotspot 510. The attributes used in the updated search query are modified in response to the user resizing the object 504' within the first image 502'. In contrast to the updated search query described with respect to FIG. 6, in this example the updated search query can include keywords and metadata associated with the object 504' selected from within the first image 502', in addition to (or instead of) any keywords and metadata in the original search query that was used by the search engine 120 to locate and retrieve the first image 502, including information describing the new size of the selected object 504' within the image 502' after the user moves the object 504'. In other words, by selecting and resizing the object 504', the search query can be updated to more specifically refer to the attributes of the object 504' within the first image 502, including the relative size of the object within the frame of the image, as opposed to the attributes of the unmodified first image 502' more generally. For example, if the original search query included the keyword "table," and the keyword "cat" is associated with the selected first image 502, then the updated search query can include the keyword "cat." The updated search query further includes metadata representing the new size of the selected first object 504' within the frame of the first image 502'. As a result of the updated search query, the search engine 120 may return one or more additional images (displayed in region 524) that are associated with the keyword "cat" as well as images where a cat appears at generally the same size within the additional images as in the modified first image 502' after the user resizes the selected first object 504'. In other words, the cat is larger or smaller in the additional images, as the case may be, than the cat in the selected first image 502'.

Figure 11:
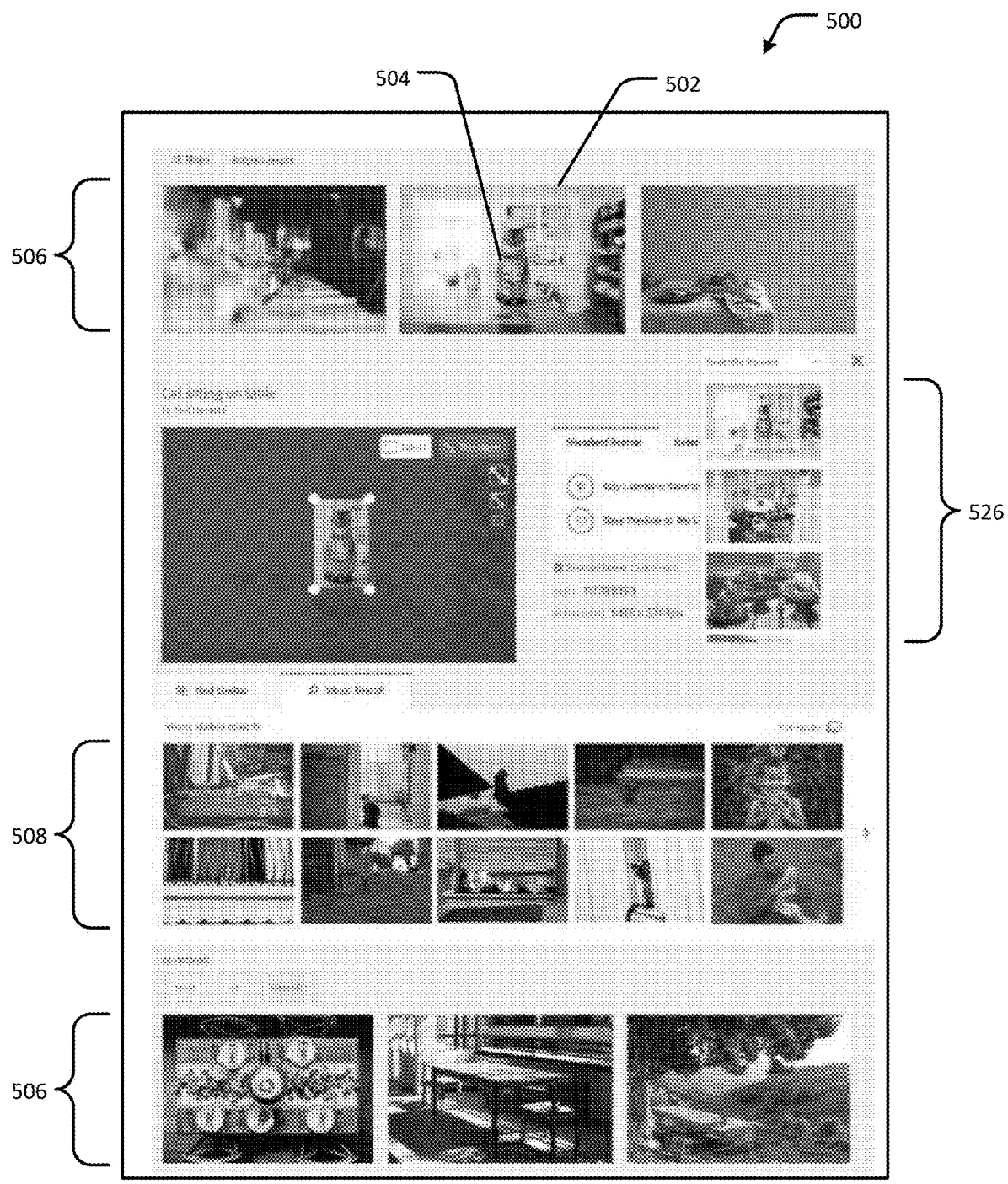

FIG. 11 shows another configuration of the GUI 500 of FIG. 5, in accordance with an embodiment of the present disclosure. FIG. 11 includes one or more recently selected images in the region indicated at 526. For example, if the user selects image 502, then a copy of image 502 is displayed in region 526. By displaying recently selected images in this manner, the user can quickly and easily reselect one of the images after selecting another image.

Figure 4:
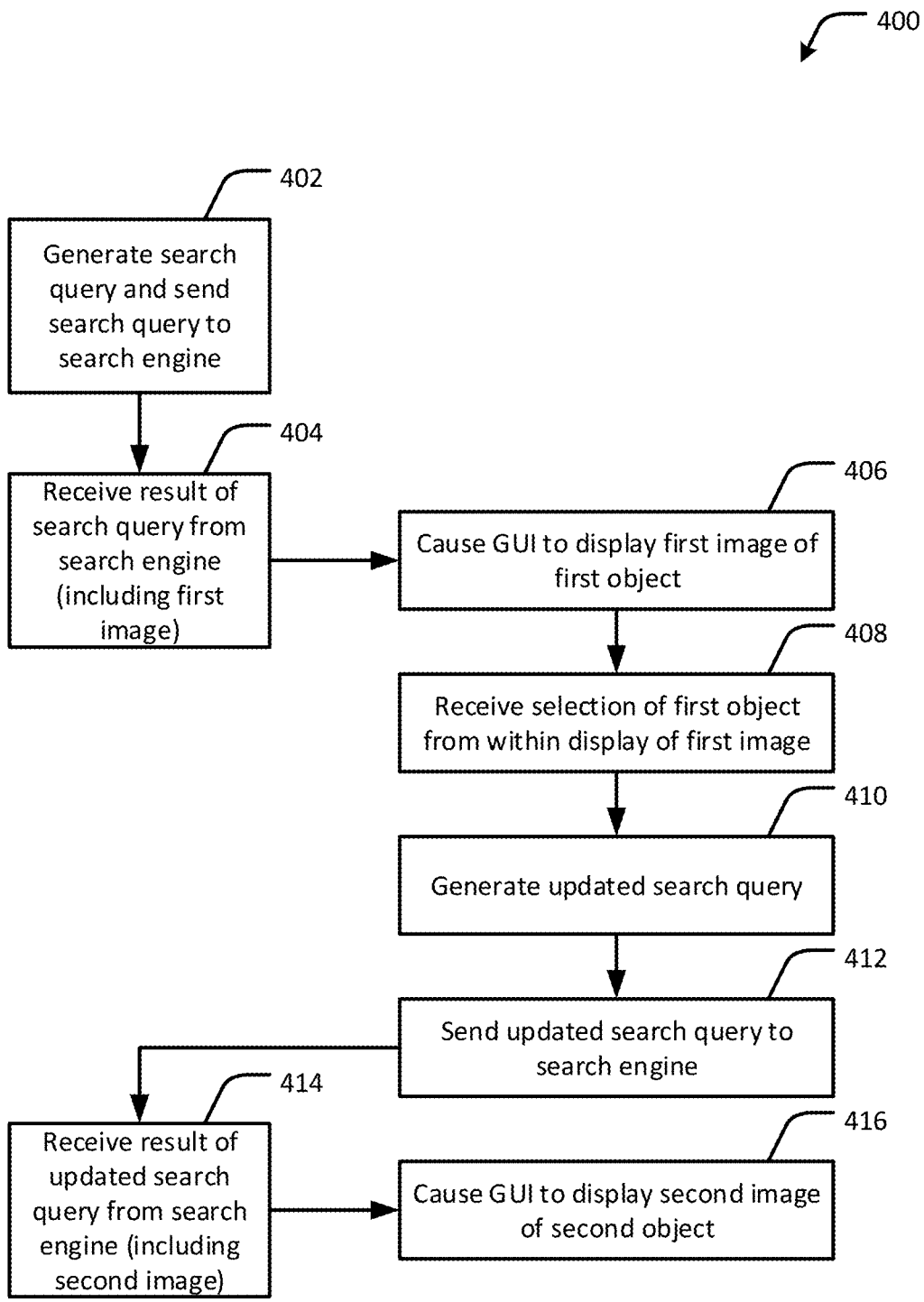
FIG. 4 is a flow diagram for another image search and retrieval method, in accordance with an embodiment of the present disclosure.

FIG. 4 is a flow diagram of another example method 400 for image search and retrieval in a digital medium environment, in accordance with an embodiment of the present disclosure. All or portions of the method 400 can be implemented, for example, in the image search and retrieval interface application 108, in the search engine 120, or a combination of both. The method 400 includes generating 402 a search query and sending the search query to the search engine 120 for processing. The search query can include keywords or metadata that the search engine 120 uses to locate and retrieve images from the image database 122 or another source of digitally encoded images. The method 404 further includes receiving 404 a result of the search query form the search engine 120. The result can, for example, include a first image of a first object.

The method 400 further includes causing 406 a GUI to display the first image of the first object corresponding to the result of a search query processed by a search engine 120. The first image is associated with first metadata representing one or more attributes of the first object in the first image, such as described above with respect to FIGS. 2, 3 and 5-11. The method 400 further includes receiving 408, via the GUI, a selection of the first object from within the display of the first image. As discussed above, the selection can include, for example, a user input where the user clicks on the object within the displayed image. The method 400 further includes, in response to receiving 408 the selection of the first object, generating 410 an updated search query that includes keywords or metadata associated with the selected object, such as the type of object, the position of the object within the image, the size of the object within the image, or any other attributes that are associated with the selected object or the selected image.

The method 400 further includes sending 412, in response to receiving the selection of the first object from within the display of the first image, the updated search query to the search engine 120. As noted above, the updated search query includes at least a portion of the first metadata representing the one or more attributes of the first object. The method 400 further includes receiving 414 a result of the updated search query from the search engine 120. The result can, for example, include a second image of a second object. The method 400 further includes causing 416 the GUI to display the second image of the second object corresponding to a result of the updated search query. The second image is associated with the portion of the first metadata representing the one or more attributes of the first object.

In some embodiments, the method 400 includes causing the user interface to display a hotspot icon corresponding to the object in the first image, where a selection of the hotspot from within the display of the first image causes the selection of the object from within the display of the first image. In some embodiments, the method 400 includes receiving, via the GUI, a modification of at least one of the attributes of the object in the first image, where the displayed second image is further associated with second metadata representing at least one of the modified attributes of the selected object. In some embodiments, the modification includes a change in a size of the object relative to a size of the first image. In some embodiments, the modification includes a change in a position of the object within the first image. In some embodiments, the second image is different from the first image. In some embodiments, the method 400 includes causing the GUI to display both the first image and the second image at the same time.

Computing Device

Figure 12:
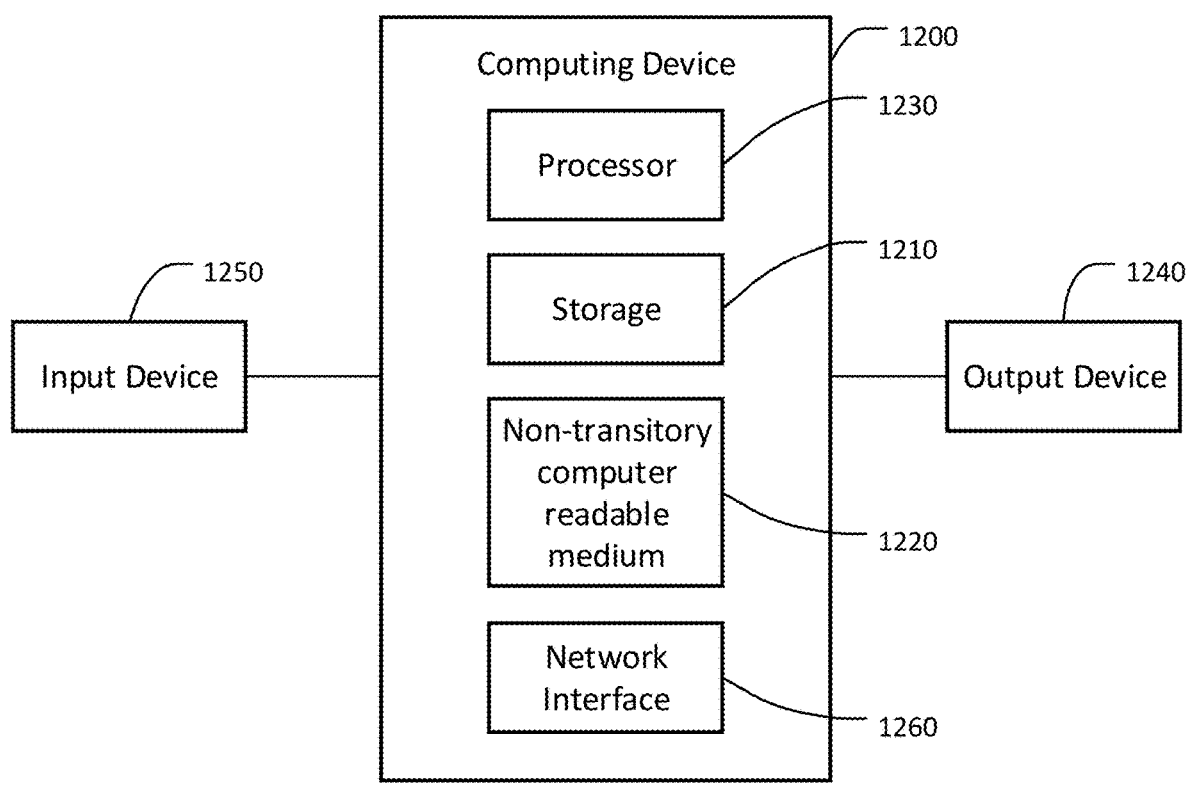
FIG. 12 is a block diagram representing an example computing device that may be used to perform any of the techniques as variously described in this disclosure.

FIG. 12 is a block diagram representing an example computing device 1200 that may be used to perform any of the techniques as variously described in this disclosure. For example, the system 100 of FIG. 1, or any portions thereof, and the methodologies of FIGS. 2, 3 and 4, or any portions thereof, may be implemented in the computing device 1200. The computing device 1200 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system may be provided including a plurality of such computing devices.

The computing device 1200 includes one or more storage devices 1210 or non-transitory computer-readable media 1220 having encoded thereon one or more computer-executable instructions or software for implementing techniques as variously described in this disclosure. The storage devices 1210 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 1210 may include other types of memory as well, or combinations thereof. The storage device 1210 may be provided on the computing device 1200 or provided separately or remotely from the computing device 1200. The non-transitory computer-readable media 1220 may include, but are not limited to, one or more types of hardware memory, non-transitory tangible media (for example, one or more magnetic storage disks, one or more optical disks, one or more USB flash drives), and the like. The non-transitory computer-readable media 1220 included in the computing device 1200 may store computer-readable and computer-executable instructions or software for implementing various embodiments. The computer-readable media 1220 may be provided on the computing device 1200 or provided separately or remotely from the computing device 1200.

The computing device 1200 also includes at least one processor 1230 for executing computer-readable and computer-executable instructions or software stored in the storage device 1210 or non-transitory computer-readable media 1220 and other programs for controlling system hardware. Virtualization may be employed in the computing device 1200 so that infrastructure and resources in the computing device 1200 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1200 through an output device 1240, such as a screen or monitor, which may display one or more user interfaces provided in accordance with some embodiments. The output device 1240 may also display other aspects, elements or information or data associated with some embodiments. The computing device 1200 may include other input devices 1250 for receiving input from a user, for example, a keyboard, a joystick, a game controller, a pointing device (e.g., a mouse, a user's finger interfacing directly with a touch-sensitive display device, etc.), or any suitable user interface, including a VR headset. The computing device 1200 may include other suitable conventional I/O peripherals. The computing device 1200 includes or is operatively coupled to various suitable devices for performing one or more of the aspects as variously described in this disclosure.

The computing device 1200 may run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 1200 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as the image search and retrieval interface application 108, the search results display module 110, the object selection and attribute modification module 112, the recently viewed results module 114, the GUI 106, or any combination of these, is implemented in software, such as a set of instructions (e.g., HTML, XML, C, C++, object-oriented C, JavaScript®, Java®, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 1200, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment includes a computer-implemented method of image search and retrieval in a digital medium environment. The method includes causing a graphical user interface to display a first image of a first object corresponding to a result of a search query processed by a search engine, the first image being associated with first metadata representing one or more attributes of the first object in the first image; receiving, via the graphical user interface, a selection of the first object from within the display of the first image; sending, in response to receiving the selection of the first object from within the display of the first image, an updated search query to the search engine, the updated search query including at least a portion of the first metadata representing the one or more attributes of the first object; and causing the graphical user interface to display a second image of a second object corresponding to a result of the updated search query, the second image being associated with the portion of the first metadata representing the one or more attributes of the first object. In some embodiments, the method includes causing the graphical user interface to display a hotspot icon corresponding to the object in the first image, where a selection of the hotspot from within the display of the first image causes the selection of the object from within the display of the first image. In some embodiments, the method includes receiving, via the graphical user interface, a modification of at least one of the attributes of the object in the first image, where the displayed second image is further associated with second metadata representing at least one of the modified attributes of the selected object. In some such embodiments, the modification includes a change in a size of the object relative to a size of the first image. In some other such embodiments, the modification includes a change in a position of the object within the first image. In some embodiments, the second image is different from the first image. In some embodiments, the method includes causing the graphical user interface to display both the first image and the second image at the same time. Another example embodiment provides a non-transitory computer program product having instructions encoded thereon that when executed by one or more computer processors cause the one or more computer processors to perform a process such as set forth in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method of image search and retrieval in a digital medium environment, the method comprising:

receiving an initial search query defined by one or more initial query parameters that characterize a first object;

causing a graphical user interface to display a first image of the first object corresponding to a result of the initial search query being processed by a search engine, the first image being associated with first metadata representing one or more attributes including a position of the first object relative to a frame of the first image;

causing the graphical user interface to display a user-selectable hotspot icon corresponding to a second object in the first image, wherein a position of the hotspot icon within the first image is determined from one or more attributes of the second object in the first image;

receiving, via the graphical user interface, a selection of the second object from within the first image, wherein selection of the hotspot icon from within the first image causes the selection of the second object from within the first image;

receiving, via the graphical user interface, a modified position of the first object relative to the frame of the first image;

generating an updated search query defined by (a) at least one of the one or more initial query parameters, (b) one or more updated query parameters that characterize the second object, and (c) one or more updated query parameters that characterize the modified position;

sending the updated search query to the search engine; and causing the graphical user interface to display a second image that includes the first object and the second object corresponding to a result of the updated search query, wherein a position of the first object relative to a frame of the second image is similar to the modified position of first object relative to the frame of the first image.

2. The method of claim 1, further comprising generating metadata for the first object, wherein the generated metadata (a) includes at least one of the one or more initial query parameters and (b) characterizes the modified position.

3. The method of claim 1, further comprising receiving, via the graphical user interface, a modified size of the first object relative to the frame of the first image.

4. The method of claim 1, wherein the second image is different from the first image.

5. The method of claim 1, further comprising causing the graphical user interface to display both the first image and the second image simultaneously.

6. The method of claim 1, further comprising determining the position of the hotspot icon based on pixel coordinates or a range of pixel coordinates that correspond to a location of the second object within the first image.

7. The method of claim 1, further comprising receiving, via the graphical user interface, a modified size of the first object relative to the frame of the first image, wherein the updated search query is further defined by one or more updated query parameters that characterize the modified size.

8. The method of claim 1, further comprising establishing a reference grid over the first image, wherein receiving the modified position includes receiving a user input representing the modified position with respect to coordinates or quadrants of the reference grid.

9. A non-transitory computer readable medium having instructions encoded thereon that when executed by one or more computer processors cause the one or more computer processors to perform a process of image search and retrieval, the process including receiving an initial search query defined by one or more initial query parameters that characterize a first object;

causing a graphical user interface to display a first image of the first object corresponding to a result of the initial search query being processed by a search engine, the first image being associated with first metadata representing one or more attributes including a position of the first object relative to a frame of the first image;

causing the graphical user interface to display a user-selectable hotspot icon corresponding to a second object in the first image, wherein a position of the hotspot icon within the first image is determined from one or more attributes of the second object in the first image;

receiving, via the graphical user interface, a selection of the second object from within the first image, wherein selection of the hotspot icon from within the first image causes the selection of the second object from within the first image;

receiving, via the graphical user interface, a modified position of the first object relative to the frame of the first image;

generating an updated search query defined by (a) at least one of the one or more initial query parameters, (b) one or more updated query parameters that characterize the second object, and (c) one or more updated query parameters that characterize the modified position;

sending the updated search query to the search engine; and causing the graphical user interface to display a second image that includes the first object and the second object corresponding to a result of the updated search query, wherein a position of the first object relative to a frame of the second image is similar to the modified position of the first object relative to the frame of the first image.

10. The non-transitory computer readable medium of claim 9, wherein the process includes generating metadata for the first object, and wherein the generated metadata (a) includes at least one of the one or more initial query parameters and (b) characterizes the modified position.

11. The non-transitory computer readable medium of claim 9, wherein the process includes receiving, via the graphical user interface, a modified size of the first object relative to the frame of the first image.

12. The non-transitory computer readable medium of claim 9, wherein the second image is different from the first image.

13. The non-transitory computer readable medium of claim 9, wherein the process includes causing the graphical user interface to display both the first image and the second image simultaneously.

14. The non-transitory computer readable medium of claim 9, wherein the process includes establishing a reference grid over the first image, and wherein receiving the modified position includes receiving a user input representing the modified position with respect to coordinates or quadrants of the reference grid.

15. A system for image search and retrieval, the system comprising:

a storage; and a processor operatively coupled to the storage, the processor configured to execute instructions stored in the storage that when executed cause the processor to carry out a process including a step for receiving, via a graphical user interface, an initial search query defined by one or more initial query parameters that characterize a first object;

a step for causing the graphical user interface to display a first image of the first object corresponding to a result of processing the initial search query, the first image being associated with first metadata representing one or more attributes including a size of the first object relative to a frame of the first image;

a step for causing the graphical user interface to display a user-selectable hotspot icon corresponding to a second object in the first image, wherein a position of the hotspot icon within the first image is determined from one or more attributes of the second object in the first image;

a step for receiving, via the graphical user interface, a selection of the second object from within the first image, wherein selection of the hotspot icon from within the first image causes the selection of the second object from within the first image;

a step for receiving, via the graphical user interface, a modified size of the first object relative to the frame of the first image;

a step for generating an updated search query defined by (a) at least one of the one or more initial query parameters, (b) one or more updated query parameters that characterize the second object, and (c) one or more updated query parameters that characterize the modified size;

a step for processing the updated search query; and a step for causing the graphical user interface to display a second image that includes the first object and the second object corresponding to a result of the updated search query, wherein a size of the first object relative to a frame of the second image is similar to the modified size of the first object relative to the frame of the first image.

16. The system of claim 15, wherein the process includes a step for generating metadata for the first object, the generated metadata (a) including at least one of the one or more initial query parameters and (b) characterizing the modified size.

17. The system of claim 15, wherein the process includes a step for receiving, via the graphical user interface, a modified position of the first object relative to the frame of the first image.

18. The system of claim 15, wherein the second image is different from the first image.

19. The system of claim 15, wherein the process includes a step for causing the graphical user interface to display both the first image and the second image simultaneously.

20. The system of claim 15, wherein the process includes a step for establishing a reference grid over the first image, and wherein the step for receiving the modified size includes receiving a user input representing the modified size with respect to coordinates or quadrants of the reference grid.

\* \* \* \* \*